Patented Jan. 9, 1945

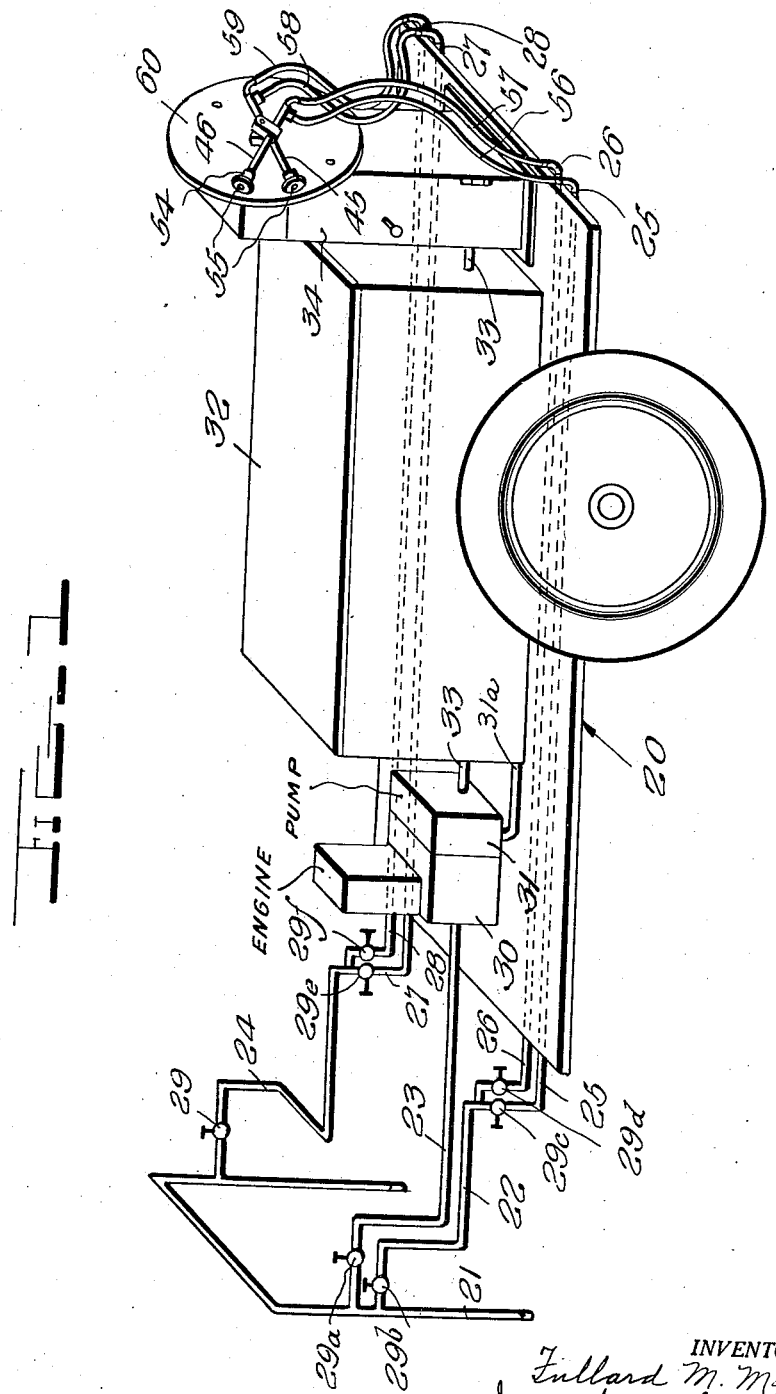

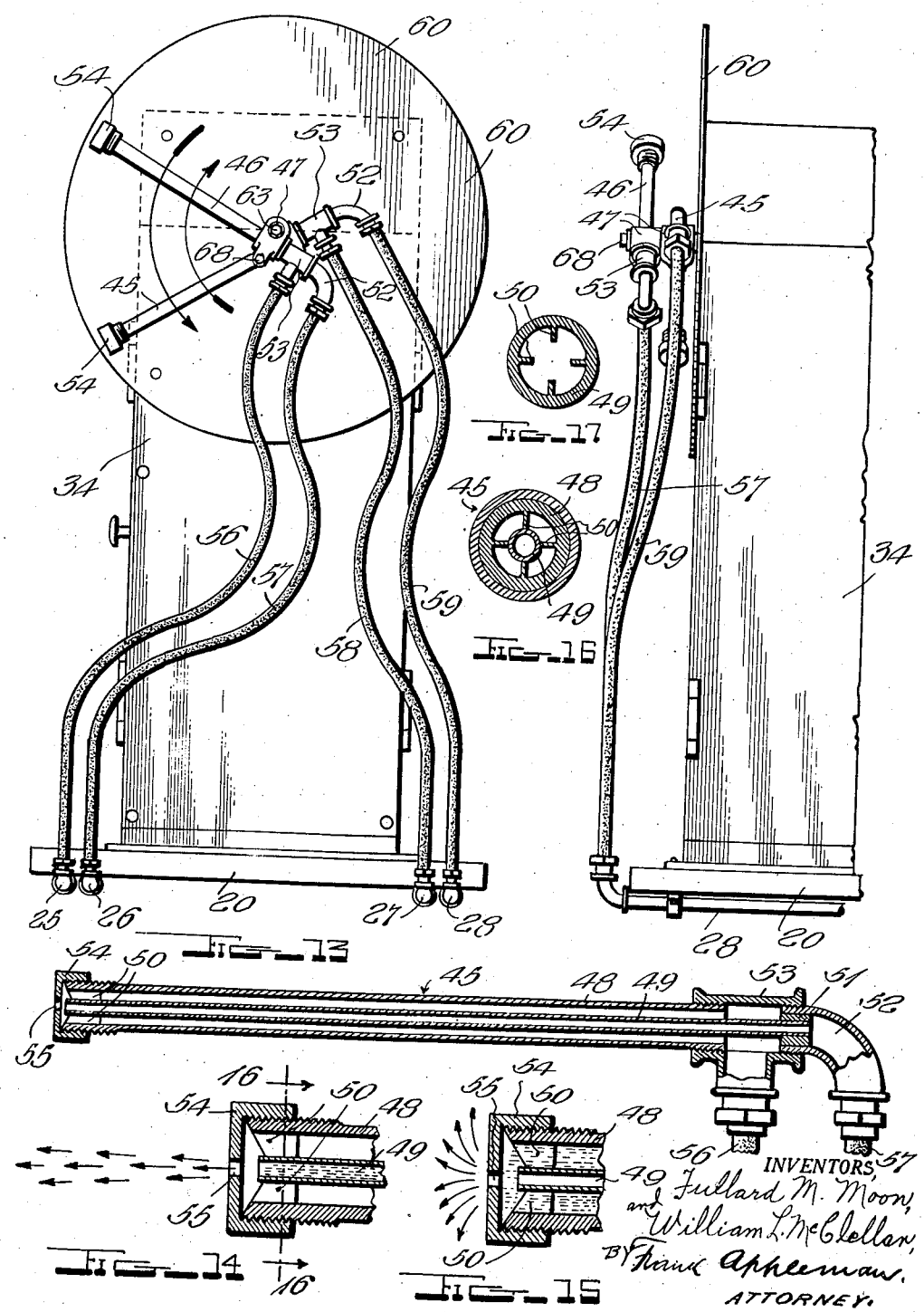

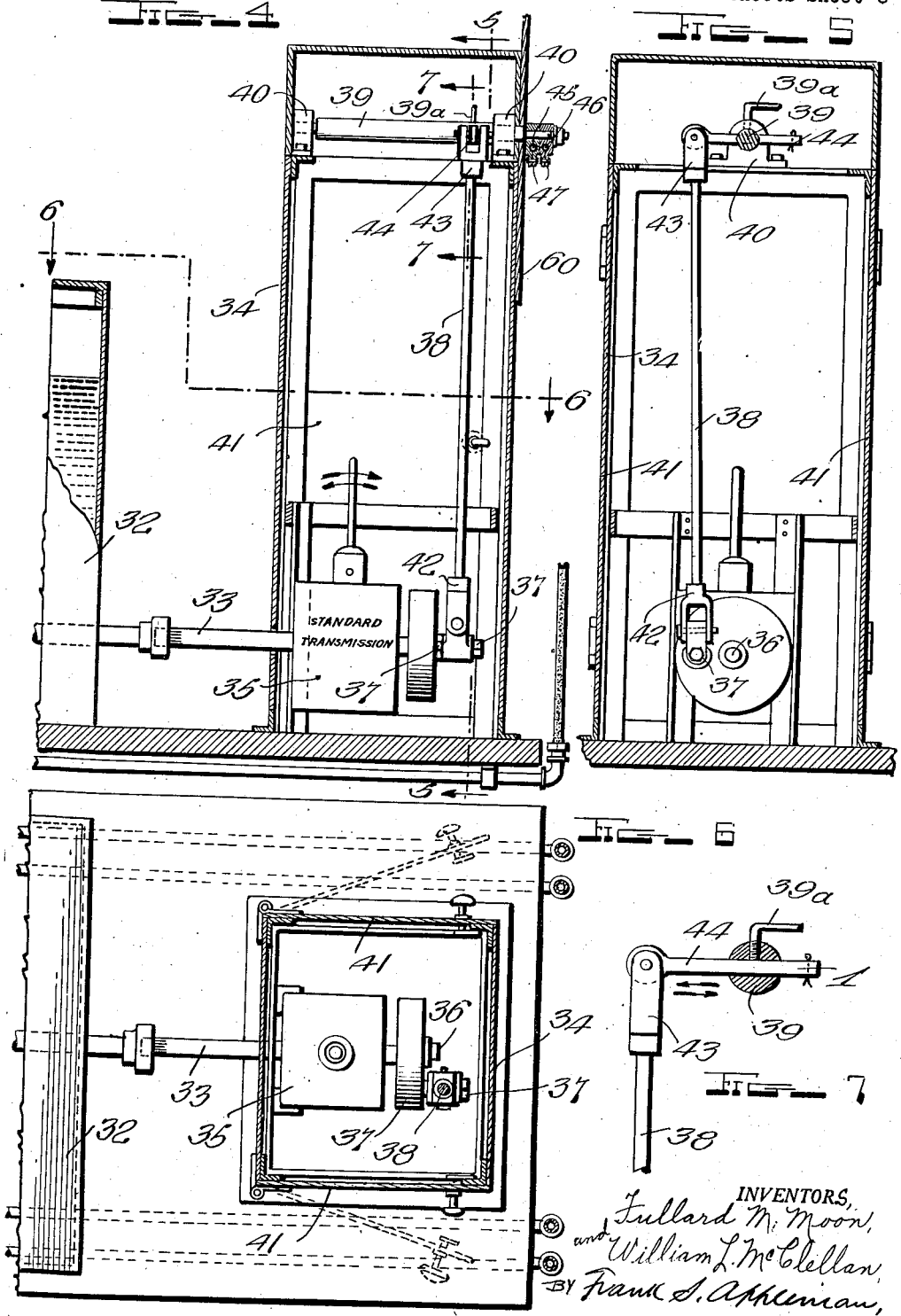

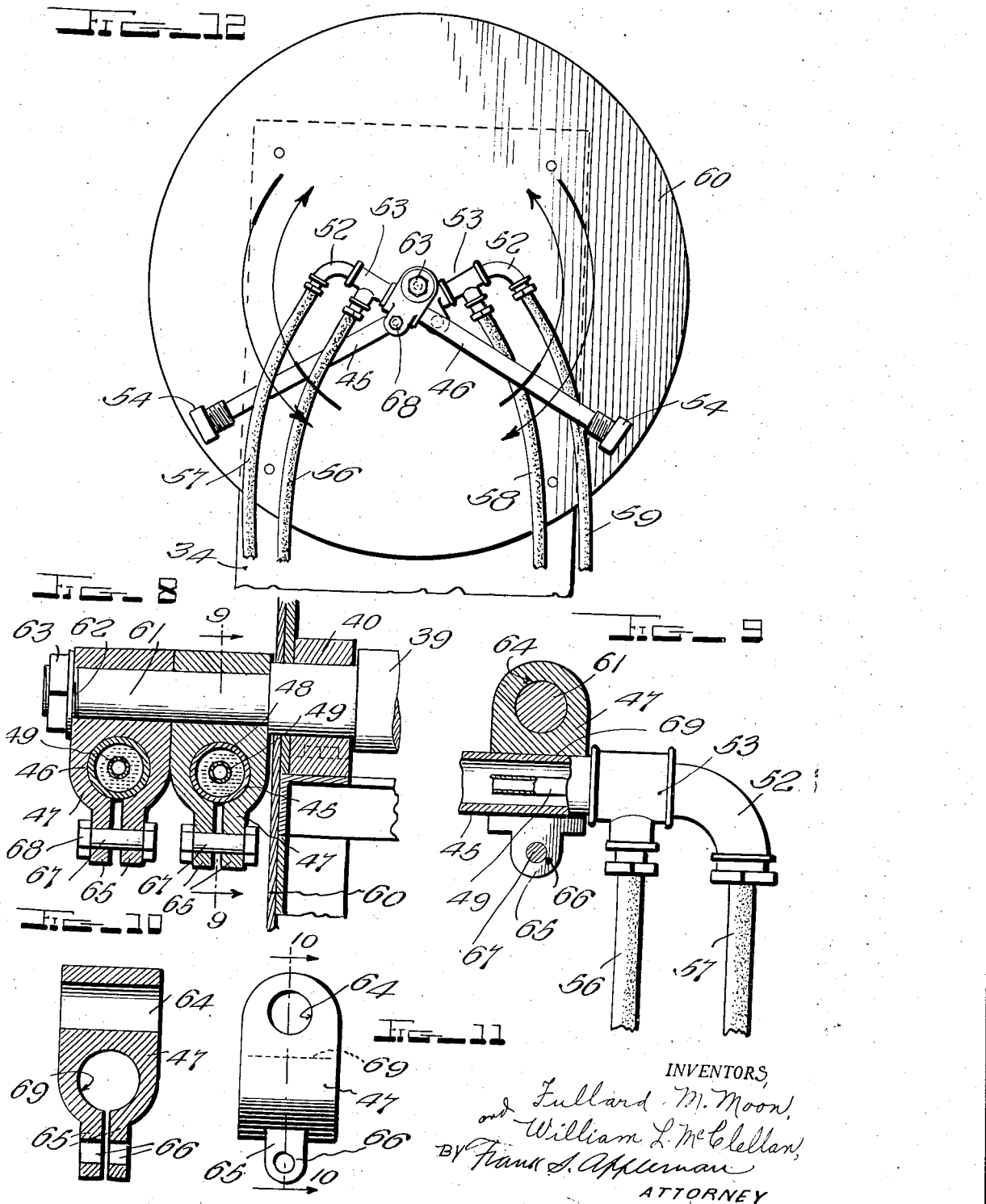

2,367,135

UNITED STATES PATENT OFFICE 2,367,135

TREE SPRAYING APPARATUS

Fullard M. Moon and William L. McClellan, Highland City, Fla.

Application November 13, 1943, Serial No. 510,198

5 Claims. (Cl. 299—37)

This invention relates to spraying apparatus, and particularly to sprayers of the type intended for distributing insecticides and the like, on trees, foliage and other vegetation, but primarily it is for use as a citrous sprayer.

The primary object for the invention is to provide a unit which may be associated with any stationary part of the apparatus. A tank is also provided wherein the solution of water and chemicals is agitated and from which it is drawn and effectively distributed on trees of high growth or bushes or trees of nursery proportions; and a further object of the invention is to provide novel means whereby the fluid, regardless of its character, may be delivered by employing a forceful stream or a stream with modified pressure that can be regulated by the operator or driver of the truck or tractor used for propelling or hauling the spraying unit.

It is furthermore an object of the invention to provide a circulatory system connected with the spray tank and with the spraying instrumentality or nozzles, whereby pressure through the system is regulated and controlled, so that delivery of the fluid can be made through pipes leading to the nozzle for delivering a forceful or modified stream or spray.

It is a further object of the invention to provide nozzles which are oscillatively mounted on a fixed part of the apparatus, preferably on the gear housing, with accompanying means for imparting rocking motion to a shaft on which the nozzles are mounted, and including means whereby the rocking motion of the shaft may be retarded or impeded according to the requirements of the job under treatment.

A still further object of the invention is to provide a shield, in the field of which the spraying nozzles are movable, so that the nozzles are protected from contact with limbs of trees which are encountered while the spraying unit is moving.

Furthermore it is an object of the invention to provide a power unit having a shaft extending through the solution tank which may be employed to agitate the contents of the fluid tank, the said shaft being extended to operate a standard transmission whereby the rock shaft of the nozzles is alternately partially rotated and, as stated, the control for the instrumentalities is within the reach of the operator of the spraying apparatus.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a perspective view showing the spraying unit disengaged from the truck or tractor which is employed for its hauling;

Figure 2 illustrates a view in elevation of the rear assembly of the spraying unit showing the nozzles and the fluid connections thereto;

Figure 3 illustrates a view in elevation at right angles to that part of the apparatus shown in Fig. 2;

Figure 4 illustrates a sectional view of a fragment of the tank and nozzle operating mechanism, parts of which are in elevation;

Figure 5 illustrates a sectional view of the apparatus on the line 5—5 of Fig. 4;

Figure 6 illustrates a sectional view of the apparatus on the line 6—6 of Fig. 4;

Figure 7 illustrates a sectional view on the line 7—7 of Fig. 4;

Figure 8 illustrates an enlarged sectional view of parts associated with the nozzle shaft;

Figure 9 illustrates a sectional view on the line 9—9 of Fig. 8;

Figures 10 and 11 illustrate detail views of clips associated with the spraying nozzle;

Figure 12 illustrates a view in elevation of the spraying nozzles in a position of adjustment to discharge at angles downwardly;

Figure 13 illustrates a sectional view of the spraying nozzle and the couplings thereto;

Figure 14 illustrates an enlarged detail view showing the fluid flow through the central pipe;

Figure 15 illustrates an enlarged detail view showing the fluid flow through the nozzle and the spraying action;

Figure 16 illustrates a sectional view through the nozzle near its outer end; and Figure 17 illustrates a detail view of the device for centering the inner pipe of the nozzle.

In these drawings 20 denotes the trailer or other wheeled member on which the spraying system is installed, and since the details of this element may be changed to suit particular requirements, it is not described in detail. A plurality of pipes 21, 22, 23, 24, 25, 26, 27 and 28 is here shown, and pipes of this general character with valves such as 29, 29a, 29b, 29c, 29d, 29e, 29f are preferably located within convenient reach of an operator of a tractor or trunk to which a trailer is attached to be drawn while the spraying device is in operation. The ends of the pipe 21 will of course be closed in appropriate manner. A suitable engine or power plant 30 associated with a pump 31 is mounted on the trailer in association with a fluid spray tank 32. A pipe 31a connects the pump with the fluid tank, and a shaft 33 of the pump is extended through the spray tank and may have an agitator thereon within the tank for mixing the fluid and chemical. At the rear of the tank, in the present embodiment of the invention, a gear housing 34 is mounted, and the shaft 33 drives a standard transmission 35 which may provide for a modified drive as to speed of the mechanism for oscillating the spraying nozzles, to be hereinafter described.

The transmission shaft 36 carries an eccentrically mounted wrist pin 37 which, through suitable elements including a connecting rod 38, communicates motion to the rock shaft 39 mounted in bearings, such as 40, near the top of the gear housing 34. The gear housing has suitably mounted doors 41, and the stroke of the connecting rod 38 may be regulated by reason of its adjustment in the connecting members 42 and 43, the former of which is mediately connected to the wrist pin, and the latter of which is mediately connected to the rock shaft 39. It is shown that the rock shaft 39 has a lever 44 adjustably connected to it so that the throw of the lever may be likewise controlled as the other parts of the members for rocking the shaft 39 are adjusted. The lever is held at different positions of adjustment by the screw 39a threaded in the rock shaft and bearing against the said lever 44.

Nozzles 45 and 46 are secured on the rock shaft by clips 47, and each of the nozzles comprises an outer pipe 48 and an inner pipe 49 spaced therefrom and held in such spaced relation by a suitable spider 50 at one end, whereas the other end of the inner pipe is supported in a bushing 51 located in a coupling 52 of the spray supply. Spraying fluid is admitted to the pipe 48 through a T-coupling 53, to which the pipe is connected, it being shown that the coupling 52 is also anchored in one end of the T-coupling. The spraying pipe has a removable hood 54 at its discharging end with an aperture 55 that registers with the bore of the pipe 49, and the said pipe 49 is intended to discharge directly through the aperture 55 for delivering a stream at full force of the pumping apparatus, whereas the spraying fluid delivered through the channel between the inner pipe 49 and the inner wall of the pipe 48 has its force checked to some degree by the hood, and the fluid issuing through the aperture 55 makes its exit therefrom in the form of a spray which results in scattering the spray so that it covers a wider range of foliage or tree surface than that issuing from the central pipe. The hood may be removed for cleaning the pipes of the nozzle, and other hoods may be provided having fine mesh of appropriate degree for regulating the character of the spray. It is desirable, at times, during the spraying operation, to deliver a stream with sufficient force so that the spray will penetrate through the entire foliage and cover all of the tree growth. This last mentioned result is desirable in treating for certain types of scale, melanious, white fly and scab.

The clips 47 each has a bore 64 to receive the reduced extended portion 61 of the shaft 39, and the end of the reduced portion 61 is threaded as at 62, and a nut 63 threaded thereon bears against the outer clip so that the clips are held on the extended end of the shaft, and said clips may be adjusted upon removal of the pressure of the nut from said outer clip. Each clip has a bore 69 to receive one of the nozzles, and the clips are split and the portions 65 thereof have apertures 66 to receive the clamping bolts 67 each adjusted in place by a nut 68 whereby the clamp is drawn to frictionally engage the nozzle. The nozzles are thus adjustably secured in place so that they may be held in the position shown in Fig. 12 where the nozzles are positioned to discharge downwardly and outwardly, although they may be adjusted to discharge upwardly and outwardly in opposite directions, or both may be positioned to discharge to one side or the other of the spray distributor.

As has been stated and as may be seen from an inspection of Figure 1, the valves may be manipulated by the operator of the truck or trailer for delivering the spraying fluid to either or both of the pipes of the nozzle, and it is furthermore shown that the pipe 25 is connected by a flexible conduit or hose 56 to the T-coupling 53, and the flexible conduit or hose 57 is connected to the coupling 52 for the inner pipe 49, similar conduits or hose 58 and 59 being connected to like couplings of the other nozzle for delivering the spraying fluid to the outer and inner pipes, respectively.

It is also seen that the nozzles are mounted back of a protecting screen or shield in the nature of a plate 60 which, in this instance, is mounted on the gear housing, and this shield is of such area as to wholly protect the nozzles in their operation so that they will not come in contact with trees or limbs of trees while the trailer is moved through a grove.

We claim:

1. In a tree spraying apparatus, a wheeled support, a fluid tank, a fluid pump and means for operating the fluid pump mounted on the support, a pipe connecting the tank and pump, the said pump having a shaft extending through the fluid tank and projecting from the rear end thereof, a gear housing, a rock shaft mounted therein and projecting therefrom, mediate means for transmitting alternate rotary motion from the first mentioned shaft to the rock shaft, nozzles mounted on the rock shaft externally of the housing, distributing pipes receiving fluid from the pump and extended to positions for control by an operator, connections between the distributing pipes and the nozzles, and a valve in each of the distributing pipes for controlling the flow of fluid to the nozzles.

2. In a tree spraying apparatus, a wheeled support, a fluid tank, a fluid pump and means for operating the fluid pump mounted on the support, a pipe connecting the tank and pump, the said pump having a shaft extending through the fluid tank and projecting from the rear end thereof, a gear housing, a rock shaft mounted therein and projecting therefrom, mediate means for transmitting alternate rotary motion from the first mentioned shaft to the rock shaft, nozzles mounted on the rock shaft externally of the housing, distributing pipes receiving fluid from the pump, connections between the distributing pipes and the nozzles, and a valve in each of the distributing pipes for controlling distribution of fluid to the couplings of the nozzle whereby spray is delivered to the pipes of the nozzle selectively or collectively.

3. In a tree spraying apparatus, a wheeled support, a fluid tank, a fluid pump and means for operating the fluid pump mounted on the support, a pipe connecting the tank and pump, the said pump having a shaft extending through the fluid tank and projecting from the rear thereof, a gear housing, a rock shaft mounted therein and projecting therefrom, a transmission in the gear housing driven by the pump shaft, an eccentrically mounted wrist pin operated from the transmission, a lever connected to the rock shaft, a rod connecting the wrist pin and lever whereby the lever is oscillated for moving the rock shaft, the said rock shaft being reduced at its outer end, clips adjustably secured thereon, a nozzle held by each of the clips, distributing pipes receiving fluid from the pump and having valves to be controlled by an operator, and connections between the distributing pipes and nozzles.

4. In a tree spraying apparatus, a wheeled support, a fluid tank, a fluid pump and means for operating the fluid pump mounted on the support, a pipe connecting the tank and pump, the said pump having a shaft extending through the fluid tank and projecting from the rear thereof, a gear housing, a rock shaft mounted therein and projecting therefrom, a transmission in the gear housing driven by the pump shaft, an eccentrically mounted wrist pin operated from the transmission, a lever connected to the rock shaft, a rod connecting the wrist pin and lever whereby the lever is oscillated for moving the rock shaft, the said rock shaft being reduced at its outer end, clips adjustably secured thereon, a nozzle held by each of the clips, distributing pipes for receiving fluid from the pump and having valves controlled by the operator, and connections between the distributing pipes and the nozzles.

5. In a tree spraying apparatus, a wheeled support, a fluid tank, a fluid pump and means for operating the fluid pump mounted on the support, a pipe connecting the tank and pump, the said pump having a shaft extending through the fluid tank and projecting from the rear end thereof, a gear housing, a rock shaft mounted therein and projecting therefrom, mediate means for transmitting alternate rotary motion from the first mentioned shaft to the rock shaft, nozzles mounted on the rock shaft externally of the housing, means whereby the nozzles are assembled selectively to discharge on one side or the other of the wheeled support, said means also selectively holding the nozzles for discharging oppositely of the line of travel of the wheeled support and either downwardly or upwardly, distributing pipes receiving fluid from the pump and extended to positions for control by an operator, connections between the distributing pipes and the nozzles, and a valve in each of the distributing pipes for controlling the flow of fluid to the nozzles.

FULLARD M. MOON.
WILLIAM L. McCLELLAN.